(12) United States Patent
Hsieh

(10) Patent No.: US 7,772,795 B2
(45) Date of Patent: Aug. 10, 2010

(54) MOTOR POSITION SIGNAL PROCESSING APPARATUS

(75) Inventor: Wen-Cheng Hsieh, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 412 days.

(21) Appl. No.: 12/017,322

(22) Filed: Jan. 21, 2008

(65) Prior Publication Data

US 2009/0184675 A1   Jul. 23, 2009

(51) Int. Cl.
*G05B 19/00* (2006.01)
*G05B 11/01* (2006.01)

(52) U.S. Cl. .................. 318/560; 318/569; 340/855.3

(58) Field of Classification Search .......... 318/560, 318/569, 592, 595, 602, 625, 661, 685, 696; 340/855.3, 870.12, 870.13; 250/231.18
See application file for complete search history.

(56) References Cited

U.S. PATENT DOCUMENTS

| | | | | |
|---|---|---|---|---|
| 4,429,267 A | * | 1/1984 | Veale | 318/594 |
| 4,751,441 A | * | 6/1988 | Lewis | 318/400.09 |
| 4,812,722 A | * | 3/1989 | Corrothers | 318/561 |
| 5,121,327 A | * | 6/1992 | Salazar | 705/408 |
| 5,530,331 A | * | 6/1996 | Hanei | 318/592 |
| 5,815,089 A | * | 9/1998 | Katagiri et al. | 340/870.03 |
| 5,874,821 A | * | 2/1999 | Monleone | 318/600 |
| 7,119,505 B2 | * | 10/2006 | Komaki et al. | 318/113 |
| 7,508,154 B1 | * | 3/2009 | Labriola, II | 318/602 |

* cited by examiner

*Primary Examiner*—Walter Benson
*Assistant Examiner*—Eduardo Colon
(74) *Attorney, Agent, or Firm*—Chung-Ming Shih; HDLS IPR Services

(57) ABSTRACT

A motor position signal processing apparatus electrically connected to a signal processor and an optical encoder of a motor control system includes a first switch, a second switch, a first signal integration amplifier, a first separator, a second signal integration amplifier, a second separator, a third signal integration amplifier, a third separator, a fourth separator and an inverter. An enable signal outputted by the signal processor is processed by the inverter to switch the operation to the first switch or the second switch. An incremental signal outputted by the optical encoder, a motor mechanical position and a reset correction signal are processed by the first, second and third signal integration amplifiers and transmitted to the signal processor for controlling the operation of a motor.

7 Claims, 4 Drawing Sheets

MOTOR POSITION SIGNAL PROCESSING APPARATUS

BACKGROUND OF THE INVENTION

1. Field of the Invention

The present invention generally relates to a position signal processing apparatus, and more particularly to a motor position signal processing apparatus.

2. Description of Prior Art

Servomechanism system refers to a system for controlling the position, speed or acceleration of a mechanical system by a close loop control method. In general, a servo system usually has several main parts including a plant, an actuator, and a controller, and the plant is a controlled object such as a mechanical arm or a mechanical working platform. The main function of the actuator is to supply power to the plant by pneumatic, hydraulic, or electric driving method. If the hydraulic method is adopted, the actuator is generally called a hydraulic servo system. At present, a vast majority of servo systems adopt the electric driving method, and the actuator includes a motor and a power amplifier, and a special design applied to a motor of the servo system is called a servo motor, which usually includes a position feedback device such as an optical encoder or a resolver. The servo motors mainly used in the industry include DC servo motors, permanent magnet AC servo motors and induction AC servo motors, and the permanent magnet servo motors are used most extensively. The function of the controller is to provide a close circuit control such as a torque control, a speed control and a position control for the whole servo system. In general, the present industrial servo drives usually include a controller and a power amplifier.

The aforementioned servo motors usually include a position feedback device for providing three types of signals through an optical encoder, and the three types of signals are: (1) Incremental signals A, B provided for obtaining the information of the moving speed of a controlled object; (2) Signals U, V, W using a combination of logical states of the signals U, V, W to represent absolute position information of an actual mechanical position of a controlled object; (3) Signal Z (Index Pulse) being a reset correction signal that provides constant mechanical position information. For the types of signals, these three signals are generally line drivers, wherein the signals U, V, W only provide the information of a start position of a signal processor (DSP or MCU) when the controlled object is started. After the optical encoder operates with the controlled object, the signal processor (DSP or MCU) primarily processes the incremental signals A, B and the signal Z (Index Pulse). Therefore, the signal processor (DSP or MCU) requires at least six pins for the interface to receive signals of the optical encoder, and such arrangement occupies a large portion of the I/O performance of the processor. Further, the power supply of the optical encoder is generally separated from the signal processor (DSP or MCU), and thus an additional separator is required, and the external circuit requires six sets of circuits for processing the signals of the optical encoder. As a result, the level of complexity of the circuits, the size of the circuit board, and the cost are increased significantly.

SUMMARY OF THE INVENTION

It is a primary objective of the present invention to overcome the foregoing shortcomings by providing signals U, V, W for detecting a start position of a motor, and the type of the signals is the same as that of the incremental signals A, B and the signal Z, and thus two multiplexers are used, and a signal processor (DSP or MCU) is provided for issuing an enable (switch) command to switch the signal reading channel, so as to reduce the cost of circuits, the size of the circuit board, and the number of pins used in the signal processor, and also meets the requirements of a compact design of the product.

To achieve the foregoing objective, the present invention provides a motor position signal processing apparatus electrically coupled to a signal processor and an optical encoder of a motor control system, and the motor position signal processing apparatus comprises: a first switch, a second switch, a first signal integration amplifier, first separator, a second signal integration amplifier, a second separator, a third signal integration amplifier, a third separator, a fourth separator and an inverter. When an enable signal outputted by the signal processor is at a low electric potential (0) and converted into a high electric potential (1) while passing through an inverter, the first switch is off and the second switch is on. Now, signals U, /U of the second switch are transmitted to a first signal integration amplifier, and signals V, /V are transmitted to a second signal integration amplifier, and the signals W, /W are transmitted to a third signal integration amplifier. After a first signal integration amplifier integrates the signals U, /U into a single end signal outputted to a signal processor, and the second signal integration amplifier integrates the signals V, /V into a single end signal outputted to the signal processor, and the third signal integration amplifier integrates the signals W, /W into a single end signal outputted to the signal processor, the signal processor outputs an enable signal to an inverter through the fourth separator and the enable signal is at a high electric potential (1) converted to a low electric potential (0) when passing through the inverter, and the first switch is on, and the second switch is off. Now, the signals A, /A of the first switch are transmitted to the first signal integration amplifier, and the signals B, /B are transmitted to the second signal integration amplifier, and the signals Z, /Z are transmitted to the third signal integration amplifier. The first signal integration amplifier integrates the signals A, /A into a single end signal outputted to the signal processor. The second signal integration amplifier integrates the signals B, /B into a single end signal outputted to the signal processor. The third signal integration amplifier integrates the signals Z, /Z into a single end signal outputted to the signal processor.

DETAILED DESCRIPTION OF THE INVENTION

The technical characteristics, features and advantages of the present invention will become apparent in the following detailed description of the preferred embodiments with reference to the accompanying drawings.

Figure 1:
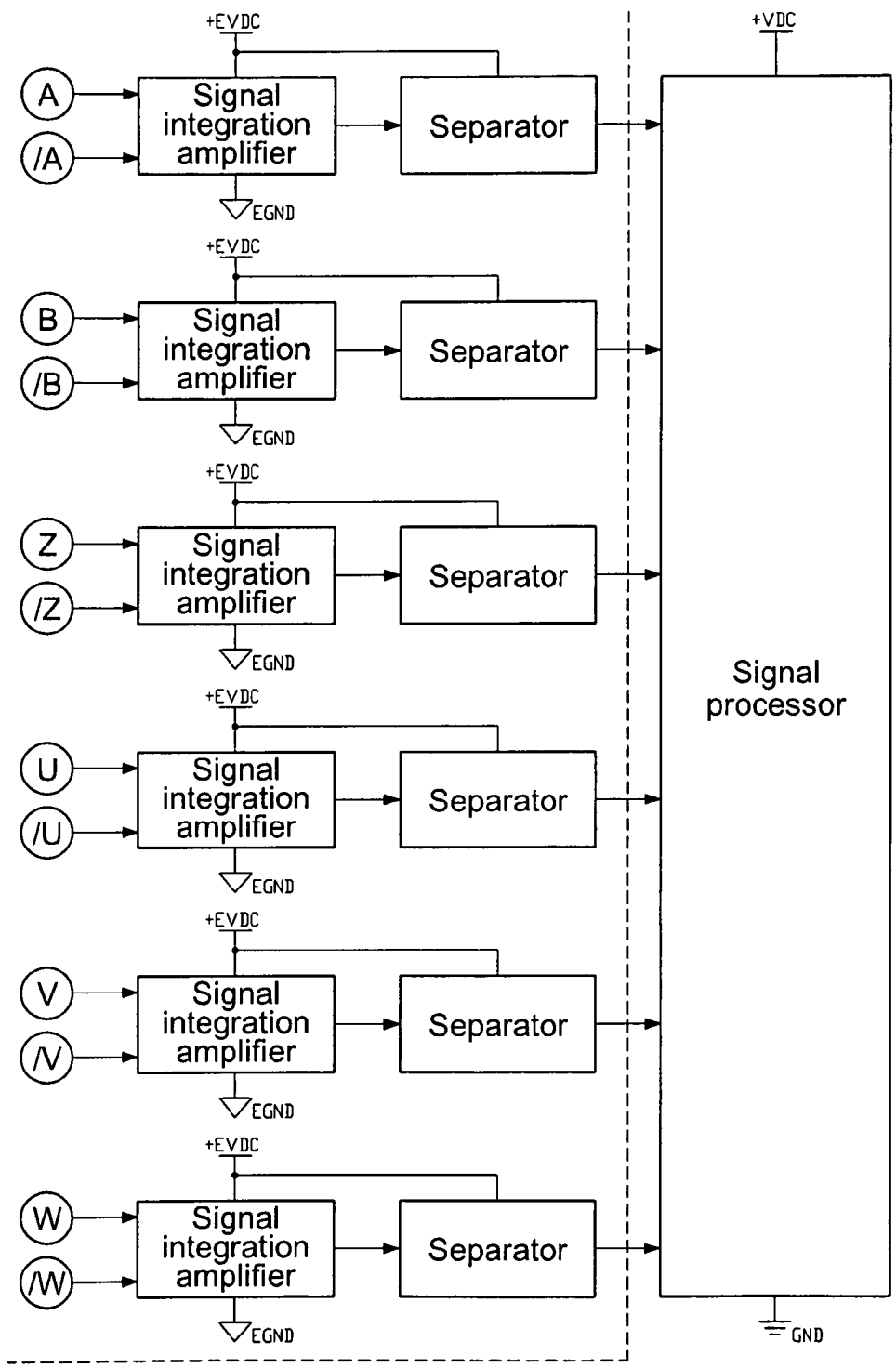
FIG. 1 is a schematic block diagram of connecting a signal processor to a traditional motor absolute position signal processing apparatus.
Figure 2:
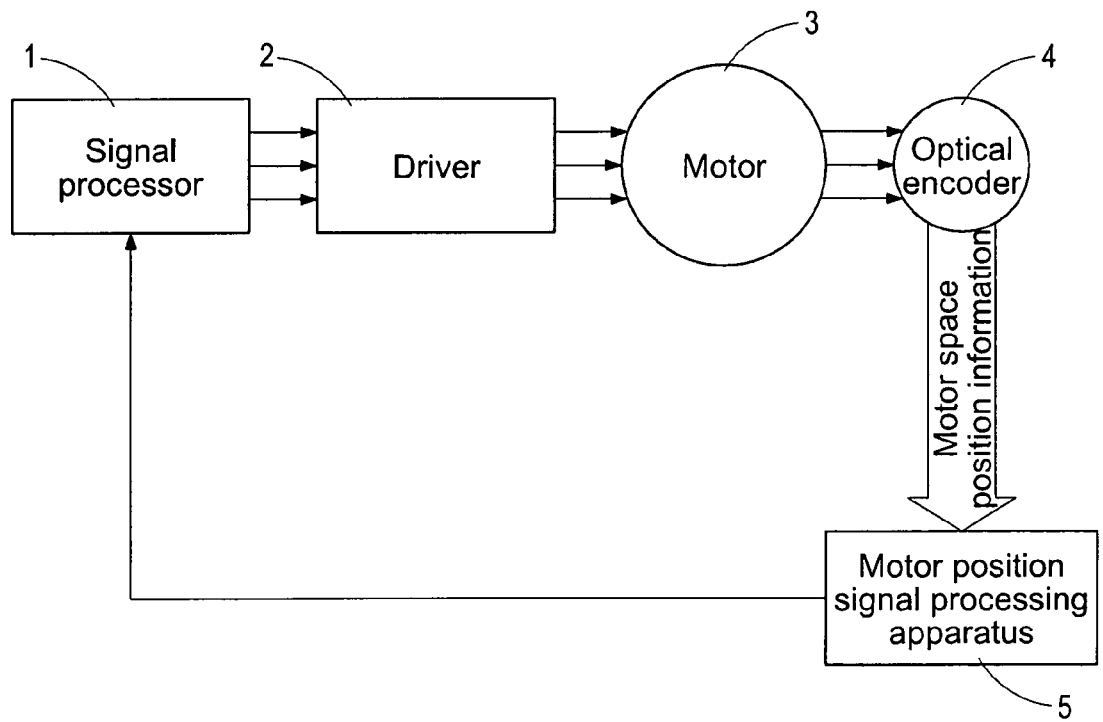
FIG. 2 is a schematic block diagram of a motor control system of the present invention.

Referring to FIG. 2 for a schematic block diagram of a motor control system of the present invention, the motor control system comprises a signal processor (DSP or MCU) 1, a driver (IGBT module) 2, a motor 3, an optical encoder 4 and a motor position signal processing apparatus 5.

To detect the start position and speed of a motor 3 for controlling the operation of the motor 3, the optical encoder 4 has to provide signals A, B, U, V, W, and a signal Z, the incremental signals A, B are provided for obtaining the information of the moving speed of the motor 3. The signals U, V, W uses a combination of logical states of the U, V, W to represent the absolute position information of an actual mechanical position of the motor 3. The signal Z (Index Pulse) is a reset correction signal for providing constant mechanical position information.

The types of the aforementioned three signals are line drivers, wherein the signals U, V, W provide the start position of a signal processor (DSP or MCU) 1 when the motor 3 is started. After the optical encoder 4 is operated with the motor 3, the signal processor 1 processes an incremental signal and a reset correction signal, and the driver 2 drives the motor 3 to operate.

Figure 3:
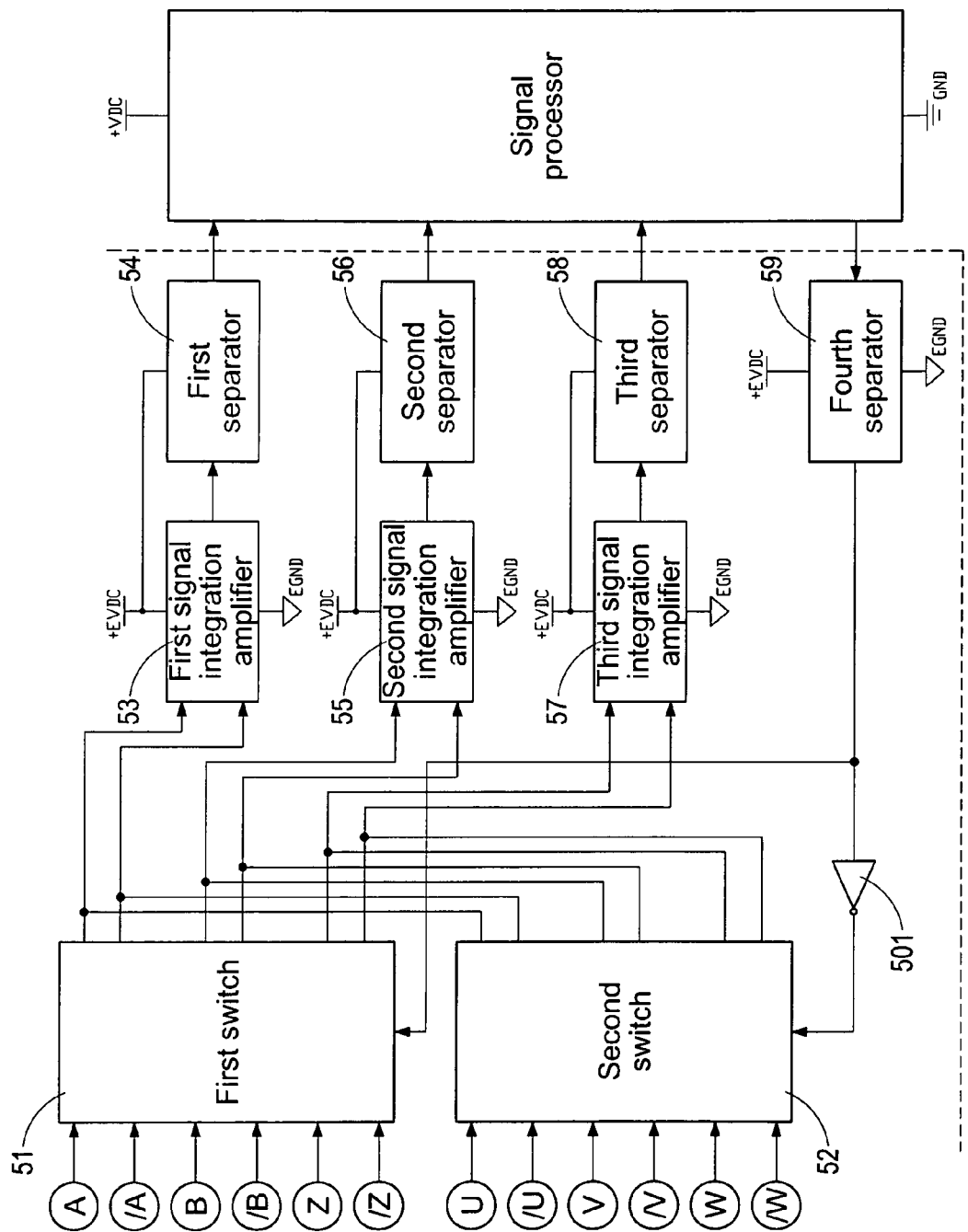
FIG. 3 is a schematic block diagram of connecting a circuit block of a motor absolute position signal processing apparatus to a signal processor in accordance with the present invention.

Referring to FIG. 3 for a schematic block diagram of connecting a circuit block of a motor absolute position signal processing apparatus to a signal processor in accordance with the present invention and FIG. 2 as well, the motor position signal processing apparatus 5 comprises a first switch 51, a second switch 52, a first signal integration amplifier 53, a first separator 54, a second signal integration amplifier 55, a second separator 56, a third signal integration amplifier 57, a third separator 58, a fourth separator 59 and an inverter 501.

The first switch 51 is a multiplexer electrically coupled to the optical encoder 4 for receiving incremental signals A, /A (inverted signal), signals B, /B (inverted signal) and signals Z, /Z (inverted signal) outputted by the optical encoder 4.

The second switch 52 is a multiplexer electrically coupled to the optical encoder 4 and the first switch 51 for receiving signals U, /U (inverted signal), V, /V (inverted signal), W, /W (inverted signal) outputted by the optical encoder 4.

The first signal integration amplifier 53 is electrically coupled to the first switch 51 and the second switch 52, for receiving signals A, /A outputted by the first switch 51 or the signals U, /U outputted by the second switch 52, and the two signals U, /U are integrated into a single end signal for the output.

The first separator 54 is an optical coupler electrically coupled to the first signal integration amplifier 53 and the signal processor 1 for isolating noises in the signals.

The second signal integration amplifier 55 is electrically coupled to the first switch 51 and the second switch 52 for receiving the signals B, /B outputted by the first switch 51 or the signals V, /V outputted by the second switch 52, and the two signals V, /V are integrated into a single end signal for the output.

The second separator 56 is an optical coupler electrically coupled to the second signal integration amplifier 55 and the signal processor 1 for isolating noises in the signals.

The third signal integration amplifier 57 is electrically coupled to the first switch 51 and the second switch 52, for receiving signals Z, /Z outputted by the first switch 51 or signals second switch 52 outputted by W, /W, and the two signals W, /W are integrated into a single end signal for the output.

The third separator 58 is an optical coupler electrically coupled to the third signal integration amplifier 57 and the signal processor 1 for isolating noises in the signals.

The fourth separator 59 is an optical coupler electrically coupled to the signal processor 1 for isolating noises in the signals.

An input end of the inverter 501 is electrically coupled to the fourth separator 59 and the first switch 51, and an output end of the inverter 501 is electrically coupled to the second switch 52 for receiving an enable signal outputted by the fourth separator 55 to switch the first switch 51 or second switch 52.

Figure 4:
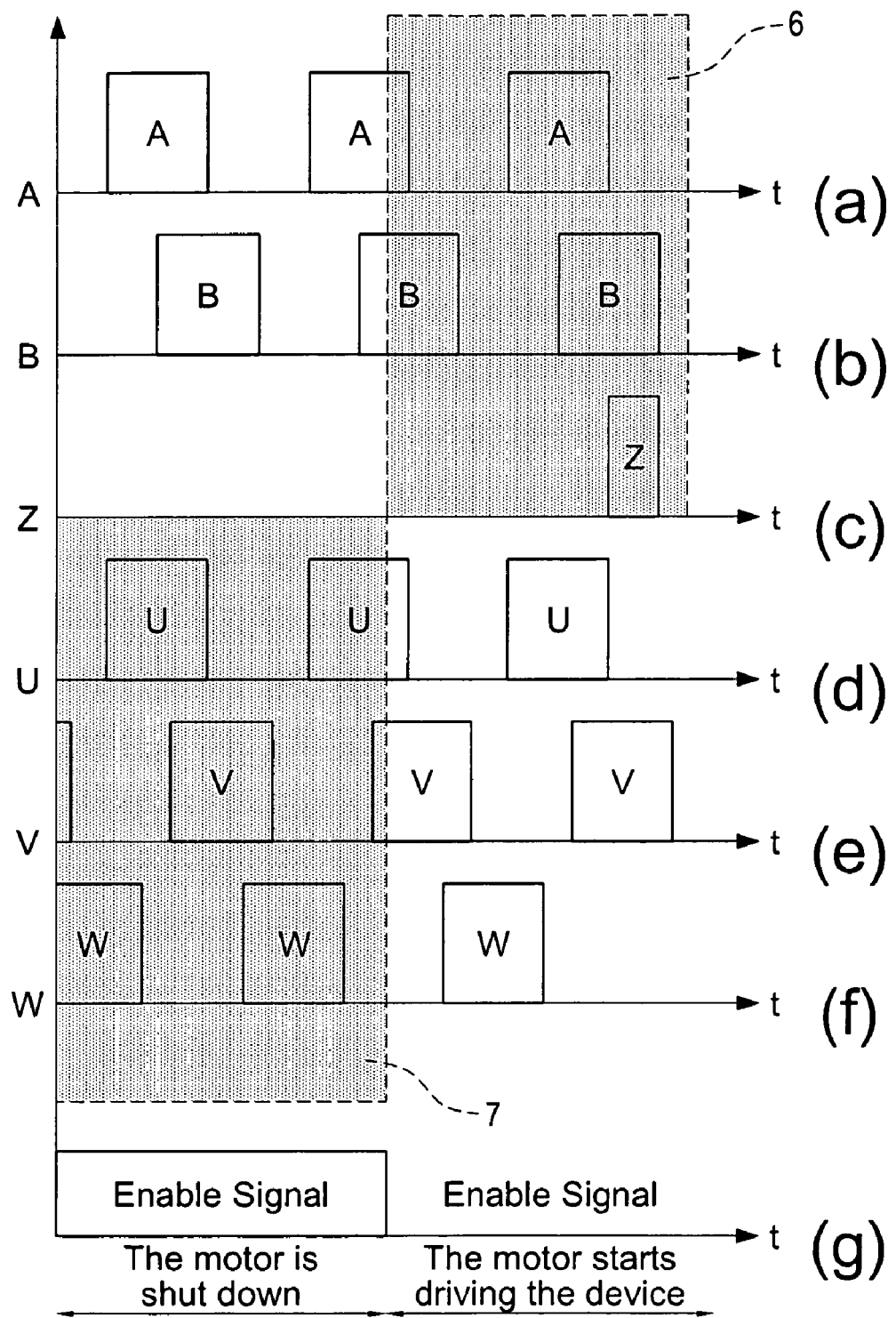
FIG. 4 shows timing charts of a motor position signal and a control signal outputted by a signal processor in accordance with the present invention.

Referring to FIGS. 3 and 4 for a schematic block diagram of connecting a circuit block of a motor absolute position signal processing apparatus to a signal processor and timing charts of control signals outputted by the signal processor in accordance with the present invention, before the motor control system has to know the start position of the motor before starting the operation of the motor. If an enable signal outputted by the signal processor 1 is at a low electric potential "0" and converted to a high electric potential "1" when passing through an inverter 56, then the first switch 51 is off, and the second switch 52 is on. Now, the signals U, /U of the second switch 52 are transmitted to the first signal integration amplifier 53, and the signals V, /V are transmitted to the second signal integration amplifier 55, and the signals W, /W are transmitted to the third signal integration amplifier 57. The first signal integration amplifier 53 integrates the signals U, /U into a single end signal for the output as shown in FIG. 4(*d*). The second signal integration amplifier 55 integrates the signals V, /V into a single end signal as shown in FIG. 4(*e*). The third signal integration amplifier 57 integrates the signals W, /W into a single end signal for the output as shown in FIG. 4(*f*). Therefore, the signals U, V and W received by the signal processor 1 are framed by a block 7 as a motor actual mechanical position signal as shown in FIGS. 4(*d*), 4(*e*) and 4(*f*).

If the signal processor 1 outputs an enable signal as shown in FIG. 4(*g*) to the inverter 501 through a fourth separator 59, and the enable signal of a high electric potential "1" is converted to a low electric potential "0" when passing through the inverter 56, so that the first switch 51 is on and the second switch 52 is off. Now, the signals A, /A of the first switch 51 are transmitted to the first signal integration amplifier 53, and the signals B, /B are transmitted to the second signal integration amplifier 55, and the signals Z, /Z are transmitted to the third signal integration amplifier 57. The first signal integration amplifier 53 integrates the signals A, /A into a single end signal for the output as shown in FIG. 4(*a*). The second signal integration amplifier 55 integrates the signals B, /B into a single end signal for the output as shown in FIG. 4(*b*). The third signal integration amplifier 57 integrates the signals Z, /Z into a single end signal for the output as shown in FIG. 4(*c*). Therefore, the signals as shown in FIGS. 4(*a*), 4(*b*) and 4(*c*) received by the signal processor 1 are reset correction signals of the incremental signals A, B and Z framed by the block 6.

In view of the description above, the present invention provides a simplified circuit to reduce the size of a circuit board, and the number of pins used by a signal processor, and thus lowering the cost.

While the invention is described in by way of examples and in terms of preferred embodiments, it is to be understood that the invention is not limited thereto. On the contrary, the aim is to cover all modifications, alternatives and equivalents falling within the spirit and scope of the invention as defined by the appended claims.

What is claimed is:

1. A motor position signal processing apparatus, electrically coupled to a signal processor and an optical encoder of a motor control system, for receiving signals A, B outputted by the optical encoder, signals U, V, W and a signal Z for controlling the operation of a motor, the motor position signal processing apparatus comprising:

a first switch, electrically coupled to the optical encoder;
a second switch, electrically coupled to the optical encoder and the first switch;
a first signal integration amplifier, electrically coupled to the first switch and the second switch;
a first separator, electrically coupled to the first signal integration amplifier and the signal processor;
a second signal integration amplifier, electrically coupled to the first switch and the second switch;
a second separator, electrically coupled to the second signal integration amplifier and the signal processor;
a third signal integration amplifier, electrically coupled to the first switch and the second switch;
a third separator, electrically coupled to the third signal integration amplifier and the signal processor;
a fourth separator, electrically coupled to the signal processor; and
an inverter, electrically coupled to the fourth separator, the first switch and the second switch;

wherein an enable signal is outputted by the signal processor and processed by the inverter to switch the operation of the first or second switch, and an incremental signal, a motor mechanical position signal and a reset correction signal outputted by the optical encoder are processed by the first, second and third signal integration amplifiers respectively and transmitted to the signal processor.

2. The motor position signal processing apparatus of claim 1, wherein the first switch is a multiplexer.

3. The motor position signal processing apparatus of claim 1, wherein the second switch is a multiplexer.

4. The motor position signal processing apparatus of claim 1, wherein the first separator is an optical coupler.

5. The motor position signal processing apparatus of claim 1, wherein the second separator is an optical coupler.

6. The motor position signal processing apparatus of claim 1, wherein the third separator is an optical coupler.

7. The motor position signal processing apparatus of claim 1, wherein the fourth separator is an optical coupler.

* * * * *